3,405,108
COPOLYMERS AND ARTICLES
Keith Jasper Clark, Welwyn Garden City, England, assignor to Imperial Chemical Industries Limited, London, England, a corporation of Great Britain
No Drawing. Filed July 6, 1964, Ser. No. 380,666
21 Claims. (Cl. 260—88.2)

ABSTRACT OF THE DISCLOSURE

A solid copolymer of 4-methyl-hexene-1 with a minor amount of a linear 1-olefine having from 4 to 8 carbon atoms. The copolymer is capable of being melt-shaped into articles of high clarity and low haze. The linear 1-olefine may be, for example, butene-1, pentene-1 or hexene-1.

---

This invention relates to copolymers of 4-methyl-hexene-1.

In our copending application No. 14,351/62 we have disclosed our discovery of transparent polymers of 4-methyl-hexene-1 and of transparent articles made from this polymer. We have now found that certain copolymers of 4-methyl-hexene-1 with certain other α-olefines can also be transparent under suitable conditions, and that such copolymers also have certain advantages over homopolymers of 4-methyl-hexene-1.

According to the present invention we provide a transparent copolymer of 4-methyl-hexene-1 with a minor amount of a linear 1-olefine having from 4 to 18 carbon atoms, and a transparent article made therefrom by a melt-shaping process.

We further provide a process for the manufacture of a transparent copolymer of 4-methyl-hexene-1 with a minor amount of a linear 1-olefine having from 4 to 18 carbon atoms wherein 4-methyl-hexene-1 and a linear 1-olefine having from 4 to 18 carbon atoms are polymerised in the presence of a stereospecific catalyst (as hereinafter defined) and the polymer obtained is de-ashed using dry reagents to reduce its ash content to less than 0.1% by weight and preferably to 0.02% by weight or less. It is a particular feature of the present invention to provide transparent copolymers of 4-methyl-hexene-1 containing between 0.5 and 30% by weight of monomer units of a linear 1-olefine having from 5 to 18 carbon atoms. Mixtures of linear 1-olefines may be used.

In the term "copolymer" we include the products of both random and sequential polymerisation.

In this specification, the word "transparent" when used of polymers, shall be taken to mean "capable of being transformed by a melt-shaping process into articles of which an ⅛" thick section has a degree of clarity of at least Grade I (as hereinafter defined) and a degree of haze of Group I (as hereinafter defined)"; when used of articles, the word "transparent" shall be taken to mean "having in ⅛" thick section a degree of clarity of at least Grade I (as hereinafter defined) and a degree of haze of Group I (as hereinafter defined)."

Overall impressions of transparency depend on two factors: clarity and haze. We define clarity as the ability to transmit light from distant objects without scattering. It is reduced by forward scattering at small angles particularly within 0.5° of the incident beam. When the clarity is perfect, the sharpness of outline and resolution of detail of distant objects viewed through parallel sided specimens are unaffected. For measuring clarity we use the following method:

A sample is prepared of ⅛" thickness. To eradicate scattering at surface scratches or imperfections, thin glass plates are stuck to the surfaces of the sample with olive oil (which has a refractive index close to that of the copolymers of our invention). Through this sample, using a fixed observation distance of 1.5 metres, a series of charts each consisting of equal width black and white lines arranged vertically, horizontally and diagonally are used. The line widths in the series are 1.0, 0.6, 0.24 and 0.175 millimetre, corresponding to angular resolutions of 0.038, 0.029, 0.0092 and 0.0067° (semi-angle). Tests are carried out in a dark room. The charts are illuminated at the most suitable brightness which is found to be about 500 candles per square metre. The sample is held close to one eye and the chart with the smallest spacing that can be resolved is noted and compared with the finest spacing that can be resolved in the absence of the sample. The results can then be expressed in terms of the loss of angular resolution due to the introduction of the sample between the eye and the charts and are independent of the limiting resolution of the eye of the observer.

For the purposes of this invention we distinguish four degrees of clarity. The clarity of mouldings from any particular sample of polymer depends not only on the conditions employed in preparing the polymer sample, but also on the conditions employed in making the mouldings.

The four degrees are:

Grade I: Loss of 0.0200° (semi-angle) resolution or less
Grade II: Loss of 0.0100° (semi-angle) resolution or less
Grade III: Loss of 0.0025° (semi-angle) resolution or less
Grade IV: No loss in visual resolution We define haze as the degree of scattering at high angles to the transmitted beam. Haze causes turbidity and hence reduction in contrast. To measure it, the intensity of light scattered from semi-angles of 2½°–90° to the incident transmitted beam is integrated and compared with the total transmittance (0 to 90°) of the sample. We employ the method described in the American Society for Testing Materials publication "ASTM Standards on Plastics," 11th edition, 1959, as Method No. 1003–59T.

In the polymers and articles of our invention we distinguish four degrees of haze:

Group 1: 0–45% haze
Group 2: 0–30% haze
Group 3: 0–15% haze
Group 4: 0–5% haze

The haze in a moulding, like the clarity, depends on polymer quality and to a certain extent on moulding conditions.

To prepare transparent polymer having the highest possible clarity and the lowest possible haze by the process of our invention, two things are essential; that a high proportion of the catalyst residues should be removed from the polymer produced, and that the polymer should not be allowed to come into contact with water until the catalyst removal process is at an end. For convenience in manipulating the polymer it is preferred that it should be produced in the form of an easily handleable slurry rather than a sticky gel. The important feature of an easily handleable slurry is that it is separable, that is, one in which the liquid can be removed from the solid phase by mechanical means. Separability is important because in the de-ashing process, the catalyst residues are made to dissolve in the liquid phase; if this cannot be separated, catalyst residues remain in the polymer and material of the highest transparency is not obtained (of course, if the slurry is separable, the original liquid phase may be removed and the polymer can be re-slurried and de-ashing carried out in a different medium from that in which polymerisation took place). Methods which may be used to separate the two phases in suitable cases include centrifuging, filtration, washing with other liquids, decantation, or any combination of these processes. Where a slurry is thick and difficult to separate because it contains too high a proportion of suspended solids, separation is made much easier by dilution. If however, a thick slurry contains more than about 10% of its total polymer content dissolved in the diluent, it will generally not be possible to render it separable by dilution.

The following are the principal factors which affect the separability of the copolymer slurry:

(1) The temperature of polymerisation and of separation.
(2) The nature of the catalyst.
(3) The nature of the diluent.
(4) The composition of the copolymer.

Each of these conditions must generally be adjusted to obtain a separable slurry. Increase in temperature of polymerisation increases the proportion of atactic polymer formed, and also gives rise to isotactic polymer of lower molecular weight, which dissolves more readily at all temperatures and particularly at the higher temperature at which it is formed. Provided stereospecific catalysts are used, the highest temperature at which a separable slurry can be obtained is that at which the isotactic polymer begins to be swollen by the diluent, or to dissolve in it to an appreciable extent.

Subject to the desirability of producing a separable slurry, one usually wants to polymerise at as high a temperature as possible, because the rate of polymerisation is then faster. The higher the temperature of polymerisation, the lower the molecular weight of polymer produced; to obtain polymer grades of higher molecular weight it may therefore be necessary to use temperatures below those which give the best rate consistent with separability. The molecular weight of the polymer formed may also be reduced, if desired, by the addition of certain polymerisation modifiers, notably hydrogen, to the reaction mixture.

There is no possibility of obtaining a separable slurry at all unless a stereospecific catalyst is employed. By a "stereospecific catalyst" we mean one which under the conditions used in polymerisation in this invention will polymerise propylene to polymer which is at least 70% insoluble in boiling heptane. It is well-known that mixtures of transition metal compounds and organometallic compounds are, in general, effective for the polymerisation of α-olefines. However, unless the catalyst used in our invention has a stereoregular action which gives rise to a sufficiently high proportion of isotactic polymer it will tend to produce intractable gels instead of separable slurries. Generally, the more stereoregular the action of the catalyst, the higher the maximum temperature which may be used in polymerisation. It will not generally be possible to predict what catalysts are stereospecific and under what conditions; trial experiments must be made with each catalyst which it is proposed to use. In our preferred process for polymerisation below we describe two particularly useful catalysts, but our invention is not limited to the use of these.

The nature of the diluent affects the temperature at which the isotactic polymer will begin to be swollen by the diluent or to dissolve in it appreciably. Suitable diluents include petroleum ether (B.P. 60–80°), a petrol fraction boiling between 180 and 220° C., toluene, chlorobenzene and 4-methyl-hexene-1 itself. Each of these diluents will give, in suitable circumstances, separable slurries.

The copolymers of this invention are intrinsically more soluble than 4-methyl-hexene-1 homopolymer, solubility increasing with decreasing 4-methyl-hexene-1 content. Thus, for example, homopolymers of pentene-1 and hexene-1 are soluble in hydrocarbon diluents at ordinary temperatures. The lower the content of 4-methyl-hexene-1 in the copolymer being made, therefore, the more care will generally be necessary to obtain a separable slurry.

A slurry which contains dissolved in the diluent a concentration of not more than 10% of the polymer content is readily separable, and it is slurries of this kind that we prefer to use in our invention. Such slurries may be obtained by our preferred method of polymerisation, that is, by polymerising at about 30° or below, using a diluent which may be a high boiling petrol fraction, petroleum ether of boiling point 60–80°, or 4-methyl-hexene-1 itself and using as catalyst an aluminium dialkyl-chloride in combination with either the crystalline material obtained by reacting titanium tetrachloride with aluminium at a temperature below 220° C. as in British Patent No. 877,050 or a material obtained by reacting titanium tetrachloride with aluminium sesquichloride in a hydrocarbon medium with stirring in an inert atmosphere at about 0° C., preferably by adding a solution of the sesquichloride drop by drop to a solution of the titanium tetrachloride.

Polymerisation is carried out in the substantial absence of air and water. Nitrogen is often used to purge the apparatus beforehand. Many different techniques are available for copolymerising the monomers. 4-methyl-hexene-1 boils at 87° C., butene-1 at −5° C., pentene-1 at 30° C., hexene-1 at 63° C. and heptane-1 at 93° C.; the higher linear 1-olefines all boil above 100° C. Copolymers may be made in a random manner by passing each monomer into the polymerisation zone at a pre-determined rate so that the concentration of each monomer in the reaction mixture is constant throughout. Copolymers may also be made by beginning polymerisation with a large amount of 4-methyl-hexene-1 (conveniently in the absence of any inert diluent medium) and passing in the other monomer at a fixed rate throughout. In this way the copolymer initially formed may be slightly richer in 4-methyl-hexene-1 than that formed later, but the effect is not large. Copolymers may be made simply by polymerising mixtures of the two monomers; in such cases the composition of the product will depend on the relative polymerisation rates of the two monomers and the polymerisation time. Sequential copolymerisation may be carried out by polymerising 4-methyl-hexene-1 while passing in the second monomer for short periods at spaced intervals, this procedure may give rise to polymer molecules containing "blocks" of 4-methyl-hexene-1 homopolymer joined by blocks of random copolymer of 4-methyl-hexene-1 with the linear 1-olefine. Finally, sequential copolymerisation may be carried out by polymerising successively pure monomers; this may be done by polymerising one monomer for a period, then removing all unreacted monomer from the polymerisation system (for example, by pumping it off under low pressure) and adding the second monomer and repeating the process. This procedure may give rise to polymer molecules containing successive blocks of homopolymer of the two monomers.

De-ashing of the polymer slurry obtained by polymerisation is carried out using dry reagents; if reagents containing water or aqueous extraction processes are used the polymer obtained shows an undesirable "blue haze" and may not be of the highest transparency. De-ashing may be carried out in two main ways. One is by adding a small quantity of reagent to the slurry, digesting for a period at a moderate temperature, e.g., between 20° and 40°, followed by filtration and washing with more de-ashing reagent or hydrocarbon or mixtures of the two. The other is first to separate all or most of the polymerisation diluent from the polymer produced and to re-slurry the polymer one or more times in de-ashing reagent. In the first process the most suitable types of de-ashing reagents are the hydrocarbon-miscible alcohols such as isopropanol butanol, or the higher alcohols such as nonanol and isodecanol and higher acids and amines such as n-nonoic acid and 3,5,5-trimethylhexylamine. Particularly effective are mixtures of alcohols with complex-forming carbonyl compounds, such as isopropanol mixed with acetylacetone. In the second process it is of particular advantage to use the lower alcohols, such as methanol and ethanol, because of their cheapness. Suitable de-ashing procedures are further described in British patent application No. 43,034/61.

Finally the de-ashing reagent or wash liquid may be separated from the polymer by filtration or centrifuging followed by evaporative methods if it is of low boiling point, e.g. if it is methanol or a low boiling petroleum ether. If it is not low boiling, e.g. if it is a hydrocarbon liquid of high boiling point, it may be separated by filtration or centrifuging or washed from the polymer by a low boiling liquid which in its turn may be separated by an evaporative method. An alternative method for removing quantities of the wash liquid after filtration or centrifuging is by steam distillation followed by drying the polymer. Final removal of a low boiling wash liquid may be satisfactorily accomplished by such methods as passing a gas (preferably for safety an inert gas such as nitrogen) through a cake of polymer particles on a filter, a centrifuge, or a fluidised bed, and in an evaporative extruder.

Manufacture of the articles of our invention using our polymers may be carried out by a variety of known techniques, e.g. extrusion, injection moulding, compression moulding, powder coating, blow moulding, and methods such as that of British specification No. 821,634.

The copolymers of our invention have lower softening points than homopolymers of 4-methyl-hexene-1, which is advantageous in enabling them to be worked at lower temperatures. They may also show other advantages, for example, the optical properties of copolymers containing between 0.5 and 30% by weight of butene-1, pentene-1 or hexene-1 are often better than those of the pure homopolymer. The flexibility of the copolymers increases with increasing content of linear 1-olefine and certain of the copolymers of this invention are sufficiently flexible for use in the manufacture of transparent "squeeze bottles."

The following example illustrates our invention but does not limit it in any way.

The titanium trichloride catalyst component used below was obtained by reaction of titanium tetrachloride and aluminium ethyl sesquichloride in a purified hydrocarbon fraction (boiling range 170–200° C.). A solution of the sesquichloride was added drop by drop, with stirring, to a solution of titanium tetrachloride over a period of several hours, the temperature being held at 0° C. The precipitate containing titanium trichloride thus formed was separated, washed with more of the hydrocarbon fraction and subjected to a heat treatment for 4 hours at 85° C. It was introduced into the polymerisation vessels in the form of a slurry with a small quantity of the hydrocarbon fraction.

EXAMPLE

A litre flask was carefully dried and purged of air by passing nitrogen through it. In it were placed 500 mls. 4-methyl-hexene-1 and 50 mls. of pentene-1, 10 millimoles aluminium diethyl chloride and 3 millimoles titanium trichloride. The mixture was stirred at 15° C. for 1¼ hours while polymerisation took place. Polymerisation was then stopped by the addition to the reaction mixture of 50 mls. dry acetylacetone and 400 mls. dry isopropyl alcohol. The resulting slurry was stirred for a short time at 20° C., the polymer was filtered off under nitrogen and washed with further amounts of acetyl acetone and isopropyl alcohol. A fine white powder was isolated. A sample of this was compression moulded at 265° C. for 5 minutes under a pressure of 20 tons/sq. in., removed from the press and promptly quenched in water to give a transparent flexible 1⁄16″ plaque showing light transmission over 80% clarity of Grade IV and haze of Group 4. The polymer obtained was crystalline and contained 24% by weight pentene-1 according to infra-red measurements.

I claim:

1. A solid crystalline copolymer of 4-methyl-hexene-1 with a minor amount of a linear 1-olefine having from 4 to 18 carbon atoms, said copolymer having an ash content of less than 0.1% by weight and being capable of being melt-shaped into articles characterized by (a) high clarity such that when expressed in terms of loss of angular resolution through a ⅛″ section the loss does not exceed 0.0200° (semi-angle) and (b) low haze value not exceeding 45% when the intensity of light scattered from 2½ to 90° to the incident beam through a ⅛″ section is integrated and compared with total transmittance (0 to 90°).

2. A copolymer as claimed in claim 1 containing between 0.5 and 30% by weight of monomer units of a linear 1-olefine having from 5 to 18 carbon atoms.

3. A copolymer as claimed in claim 1 containing between 0.5 and 30% by weight of butene-1, pentene-1 or hexene-1 monomer units.

4. A copolymer as claimed in claim 1, said copolymer being capable of melt shaping into articles having in ⅛″ section clarity such that the loss in resolution does not exceed 0.0100°.

5. A copolymer as claimed in claim 1, said copolymer being capable of melt shaping into articles having in ⅛″ section clarity such that the loss in resolution does not exceed 0.0025°.

6. A copolymer as claimed in claim 1, said copolymer being capable of melt shaping into articles having in ⅛″ section clarity such that there is no loss in visual resolution.

7. A copolymer as claimed in claim 1, said copolymer being capable of melt shaping into articles having in ⅛″ section haze value of 0 to 30%.

8. A copolymer as claimed in claim 1, said copolymer being capable of melt shaping into articles having in ⅛″ section haze value of 0 to 15%.

9. A copolymer as claimed in claim 1, said copolymer being capable of melt shaping into articles having in ⅛″ section haze value of 0 to 5%.

10. A transparent article comprising a copolymer claimed in claim 1.

11. A process for preparing an article claimed in claim 10 wherein a copolymer claimed in claim 1 is subjected to a melt shaping process.

12. A process for the manufacture of a solid transparent copolymer of 4-methyl-hexene-1 with minor amounts of a linear 1-olefine having from 4 to 18 carbon atoms as defined in claim 1 which comprises polymerizing 4-methyl-hexene-1 and a linear 1-olefine having from 4 to 18 carbon atoms in the presence of a stereospecific catalyst which consists essentially of a trivalent titanium halide activated by aluminium dialkyl halide and then de-ashing the copolymer obtained using dry reagents to reduce its ash content to less than 0.1% by weight.

13. A process as claimed in claim 12 wherein the ash content of the copolymer is reduced to less than 0.02% by weight.

14. A process as claimed in claim 12 wherein the trivalent titanium halide is obtained by the reduction of titanium tetrachloride with an aluminium alkyl compound.

15. A process as claimed in claim 14 wherein the reduction of the titanium tetrachloride is carried out in a hydrocarbon medium at about 0° C. by adding aluminium alkyl sesquichloride thereto gradually over a period.

16. A process as claimed in claim 12 wherein the temperature of polymerisation is not in excess of about 30° C.

17. A process as claimed in claim 12 wherein as de-ashing reagent is used an alcohol, or a mixture of an alcohol and acetylacetone.

18. A process as claimed in claim 17 wherein the alcohol in methanol, ethanol, isopropanol, butanol or nonanol.

19. A process as claimed in claim 12 wherein the linear 1-olefine is butene-1, pentene-1 or hexene-1.

20. A process as claimed in claim 12 wherein a mixture of linear 1-olefines is copolymerised.

21. The copolymer of claim 1 wherein said linear 1-olefine is pentene-1.

References Cited

UNITED STATES PATENTS 3,257,367   6/1966   Haven _____ 260—93.7

FOREIGN PATENTS 648,286   8/1962   Canada.

JOSEPH L. SCHOFER, *Primary Examiner.*

M. B. KURTZMAN, *Assistant Examiner.*

UNITED STATES PATENT OFFICE
CERTIFICATE OF CORRECTION

Patent No. 3,405,108                                October 8, 1968

Keith Jasper Clark

It is certified that error appears in the above identified patent and that said Letters Patent are hereby corrected as shown below:

In the heading to the printed specification, after line 6, insert -- Claims priority, application Great Britain, July 31, 1963, 30,341/63 --. Column 1, line 12, "4 to 8" should read -- 4 to 18 --.

Signed and sealed this 17th day of February 1970.

(SEAL)
Attest:

Edward M. Fletcher, Jr.                    WILLIAM E. SCHUYLER, JR.
Attesting Officer                            Commissioner of Patents